(12) United States Patent  
Han (10) Patent No.: US 6,329,998 B1
(45) Date of Patent: Dec. 11, 2001

(54) MULTIPLE SCREEN PROCESSOR FOR PROCESSING VIDEO IMAGE DATA FORMATS

(75) Inventor: Dongil Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/131,223

(22) Filed: Aug. 7, 1998

(30) Foreign Application Priority Data

Aug. 28, 1997 (KR) .................................................. 97-42185
Dec. 1, 1997 (KR) .................................................. 97-65028

(51) Int. Cl.$^7$ .................................................. G09G 5/00
(52) U.S. Cl. .................. 345/581; 345/780; 345/781; 345/782; 345/788; 345/790; 345/794
(58) Field of Search .................................... 345/112, 114, 345/113, 1, 780, 781, 782, 783, 788, 790, 794, 115, 116, 581; 348/586, 588, 903, 2, 3, 564, 563, 565, 566, 567, 584, 597, 598, 599

(56) References Cited

U.S. PATENT DOCUMENTS

| | | | |
|---|---|---|---|
| 5,091,786 | * | 2/1992 | Miyaguchi ............................ 358/183 |
| 5,479,497 | * | 12/1995 | Kovarik ................................ 379/265 |
| 5,719,592 | * | 2/1998 | Misawa ................................ 345/113 |
| 5,767,894 | * | 6/1998 | Fuller et al. ............................ 348/8 |
| 5,912,710 | * | 6/1999 | Fugimoto ............................ 348/445 |
| 6,016,184 | * | 1/2000 | Haneda ................................ 355/36 |
| 6,094,230 | * | 7/2000 | Han ..................................... 348/564 |

* cited by examiner

Primary Examiner—Richard Hjerpe
Assistant Examiner—Jean Lesperance

(57) ABSTRACT

A multiple screen HDTV (High Definition television) processor includes two detectors and a background screen generator. The first detector generates an output signal when format change is detected. The second detector generates an output signal when change in the selected multiple screen is detected. Either output signals activate the background screen generator to delete residuary screen portions caused by different screen sizes and aspect ratios in a multiple screen generation system.

23 Claims, 7 Drawing Sheets

16:9 PIP

4:3 PIP active window

MULTIPLE SCREEN PROCESSOR FOR PROCESSING VIDEO IMAGE DATA FORMATS

BACKGOUND OF THE INVENTION

The present invention relates to the digital television system and more particularly to a system for processing a variety of standardized video image data formats.

In the United States, the digital television (TV) standard allows many types of video image formats, i.e. transmission frequency rates of 24 Hz, 30 Hz, 60 Hz; progressive scanning and interlaced scanning; and screen resolutions of 480×640, 480×704, 720×1280, 1080×1920. Accordingly, a digital TV system must be capable of processing a variety of image formats, especially because formats may constantly change, even for the same channel. Additionally, the different types of image formats and/or frame rates may also affect the size of the video image on a screen window. Thus, a digital TV system for a multiple screen TV must process many different video image sizes and frame rates according to the incoming image formats, as well as generate the image on the appropriate window of the multiple screen TV.

Figure 1:
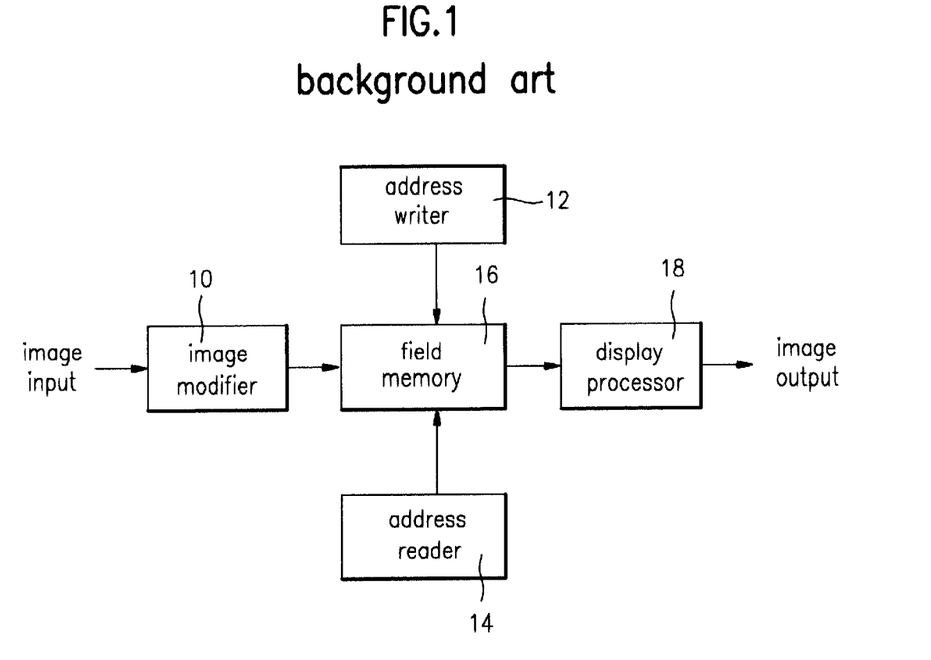
FIG. 1 is a block diagram of a general multiscreen HDTV processor.

Referring to FIG. 1, a multiple screen processor generally includes an image modifier (10), an address writer (12), an address reader (14), a field or frame memory (16), and a display processor (18). As shown, the image modifier (10) receives and modifies the input image to fit the display screen window size, and stores the reduced/enlarged video image in the appropriate address within the field memory (16) generated by the address writer (12). The address reader (14) timely reads the video image information stored in the field memory (16) and outputs the appropriate video image to the display processor (18). The display processor (18) additionally prepares the video image for display on the TV screen window.

Figure 2:
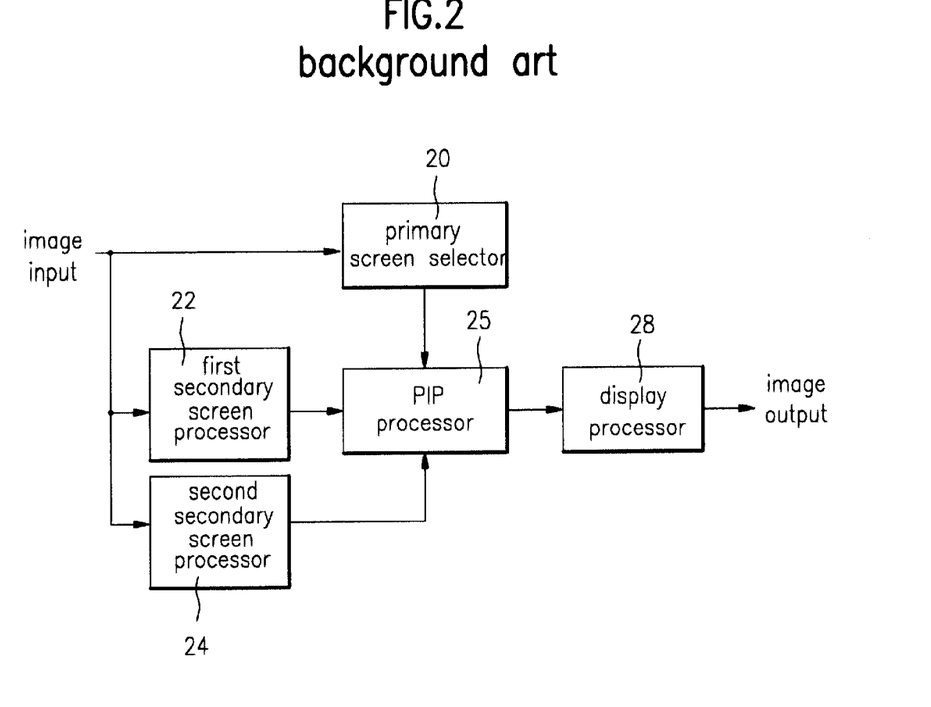
FIG. 2 is an alternative embodiment of a general multiscreen HDTV processor.

FIG. 2 shows an alternative multiple screen processor including a primary screen selector (20), first and a second secondary screen processors (22), (24), a PIP processor (26), and a display processor (28). In such arrangement, the primary screen selector (20) selects only the necessary video images from image output of a tuner (not shown) and outputs the video image to the PIP processor (26). Secondary screen processors (22) and (24) fit the incoming video image to the display screen window size, store the image using a FIFO, and timely output the image to the PIP processor (26). The display processor (28) generates the final display screen in a timely manner using the outputs of the primary screen selector (20), and the first and second secondary screen processors (22), (24). More particularly, the primary screen selector (20) outputs the image to the display processor (28) at the time the primary screen is to be displayed, and the secondary screen processors (22), (24) outputs the image to the display processor (28) when the secondary screen is to be displayed.

Figure 3:
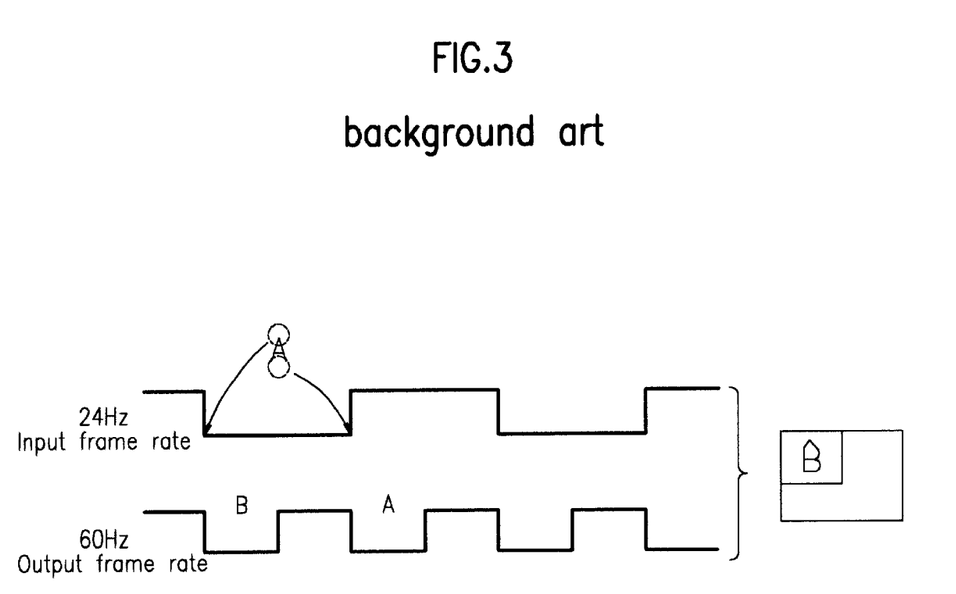
FIG. 3 is an example of input images with different frame rates.

The multiple screen processors as discussed above are capable of processing inputs of consistent video image formats and/or frame rates. However, the input images come in many different frame rates and/or data formats. For example, FIG. 3 shows a consecutive display of the letter 'A' followed by the letter 'B' when the input frame rate is 24 Hz and the output display frame rate is 60 Hz. Because of the difference between the input and the display frame rates, the top portion of letter 'B' is overlapped by the residuary top portion of the previous letter 'A.' Thus the multiple screen processor has problems generating video image according to the changing image formats and frame rates.

OBJECTIVES OF THE INVENTION

The object of the present invention is to provide a multiple screen HDTV system for smoothly generating the multiple screen windows without any distortions or residuary image portions.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWING

The invention will be described in detail with reference to the following drawings in which like reference numerals refer to like elements wherein.

DETAILED DESCRIPTION OF THE INVENTION

For solving the problems related to constantly changing image sizes, the preferred embodiment of the present multiple screen processor includes a means for detecting the image format type of the incoming image, a means for detecting both the changes in the format type detected by the format detecting means and changes in the multiple screen window selection, a means for processing the background screen window in response to the change detecting means, and a means for writing and reading the image data output by either the background processing means or the image modifier to display the image on the selected multiple screen window. Also, in an alternative embodiment, the multiple screen processor may additionally include a means for trimming the video image border depending on the format detecting means before inputting the image to the image modifier, and an image modifier with a means for vertically and horizontally filtering the received image and reducing/enlarging the image by the image modifier.

The preferred embodiment of the present invention will be described with reference to FIGS. 4 and 5. Particularly, FIG. 4 shows a block diagram of a multiple screen HDTV processor incorporating the present inventive concept and FIG. 5 shows a block diagram of an image modifier.

Figure 4:
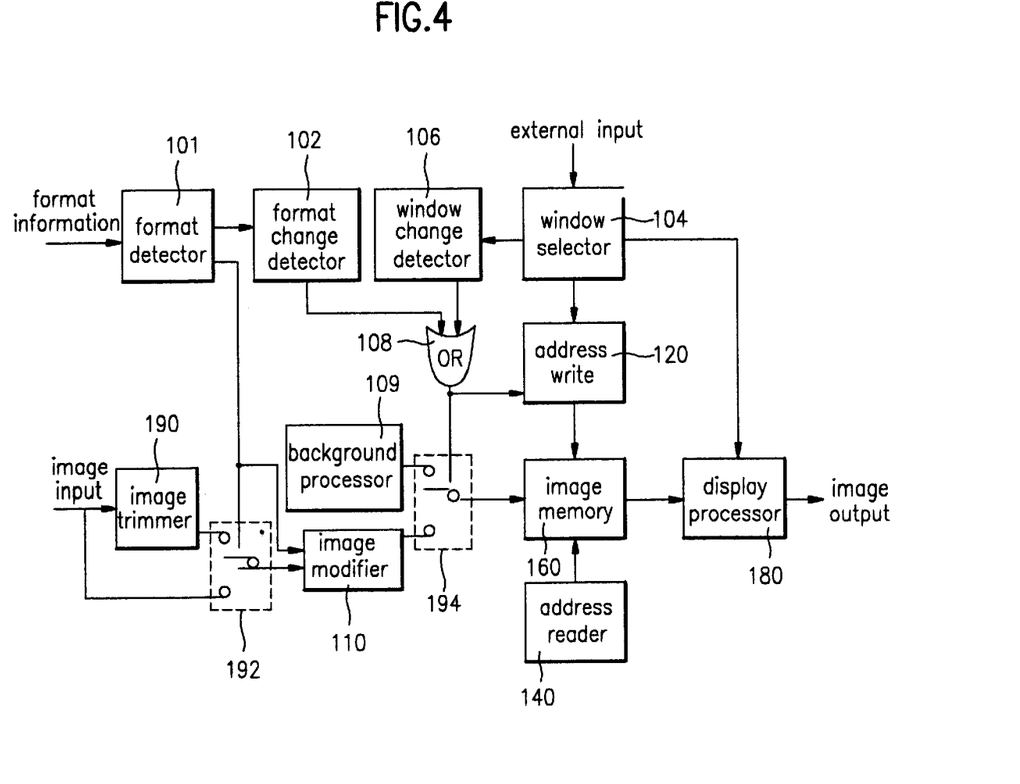
FIG. 4 is a block diagram of a preferred embodiment of a multiscreen HDTV processor.

Referring to FIG. 4, the preferred embodiment of the multiple screen HDTV processor includes a format detector 100 receiving the video image format information and detecting the format type; a format change detector 102 identifying a change in the format type detected by the format detector 100; a window selector 104 selecting a window of the multiple screen TV responsive to an external input; a window change detector 106 identifying a change in the window selected by the window selector 104; an OR gate 108 coupled to the outputs of the format change detector 102 and the window change detector 106; an image trimmer 190 receiving the image information and trimming the borders of the image data; a first switch 192 coupled to the format detector 100 outputting either the original image input or the trimmed image from the image trimmer 190; a background processor 109 generating a background portion of the image on a screen; an image modifier 110 receiving the selected image of the first switch 192 and fitting the image to the display window size; a second switch 194 coupled to the OR gage 108 outputting either the output of the background processor 109 or the image modifier 110; an address writer 120 coupled to the window selector 104 generating the appropriate writing address of the selected window; an address reader 140 generating reading address of the image, an image memory 160 receiving the image data selected by the second switch 194 and writing the image data to the writing address generated by the address writer 120 before reading the image data using the reading address generated by the address reader 140, and a display processor 180 coupled to the image memory 160 and the window selector 104 processing the image for final display.

Figure 5:
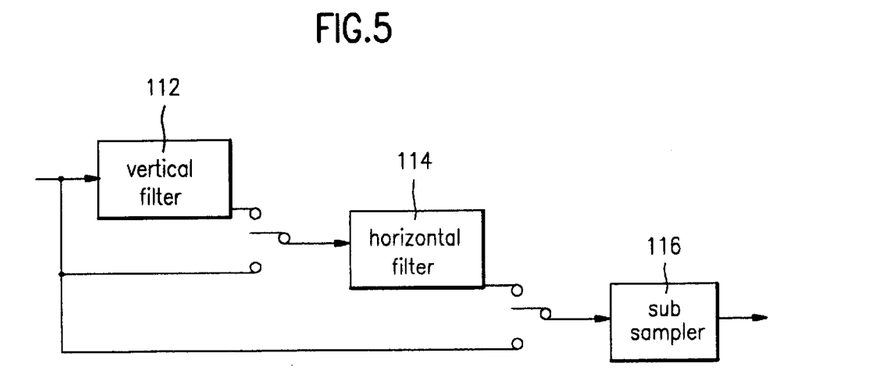
FIG. 5 is a block diagram of an image modifier in FIG. 4.

Referring to FIG. 5, the image modifier 110 may further include a vertical filter 112 vertically filtering the selected output of the first switch 192, a horizontal filter 114 horizontally filtering either the selected output of the first switch 192 or the vertically filtered output of the vertical filter 112, and a sub sampler 116 for either sub sampling the output of the first switch 192 or sub sampling the filtered output of the horizontal filter 114. Detailed description of will be discussed below.

In the United States, Grand Alliance (GA) standard allows 18 types of image formats for digital TV transmissions. Moreover, the bit stream containing the image format information also includes the image data itself. Accordingly, the format detector 100 receives the image format information from the bit stream and detects the type of format.

For some image formats, cutting the borders before the image is output to the image modifier 110 facilitates the image modification and reduces the necessary hardware. Thus the image trimmer 190 receives the image and trims the borders. The format detector 100 controls the first switch 92 to select and output to the image modifier 110, either the trimmed image or the original input image depending on the format type. The selected image is fitted to the display window size according to the detected format by the image modifier 110.

The image modifier 110 may include a decimation process by low pass filtering the image through the vertical filter 112 and the horizontal filter 114 before modifying the image to fit the display size. Because the vertical filter 112 requires complex memory hardware, vertical filter 112 can be omitted for a simpler hardware design. The horizontal filter 114 stores various pixels of the inputted image data, and is relatively simple to construct, however the horizontal filter may also be omitted for a simpler design. Depending on the design, the image data passes through both the vertical and horizontal filters 112, 114 or just the horizontal filter 112 or directly passes to the sub-sampler 116 to reduce/enlarge the image.

The format change detector 102 receives the detected format from the format detector 100 and continuously checks for any changes in the format type. When a change is detected, the format change detector 102 generates an output signal indicating the change within one frame period. Also, through television receivers such as microcomputer and the remote control, the window selector 104 receives a multiple screen window selection, and outputs a signal indicating the window selection to both the window change detector 106 and the display processor 180. The window change detector 106 receives the signal indicating the selected multiple screen window and continuously checks for any change in the selected window location. When a change is detected, the window change detector 106 generates an output signal indicating the change within one frame period.

The OR gate 108 receives the output signals of the format change detector 102 and the window change detector 106 to output a signal to the second switch 194. The background processor 109 generates the necessary background portion for the display, generally storing a black background data color and changing the color when required.

As discussed above, in a digital TV, many types of image formats are input for one channel. Depending on the time, the input image format changes which may also change the video image screen ratio (aspect ratio) from 16:9 to 4:3 or from 4:3 to 16:9. For example, if the aspect ratio changes from 16:9 to 4:3, the image for the 4:3 is relatively smaller in width than an image for a 16:9 aspect ratio and a portion of the previous image will remain outside the borders of a 4:3 screen. Accordingly, a portion of the previous image must be erased for a clean display. Also, the location of the multiple screen window may change, thereby changing the aspect ratio from 4:3 to 16:9. Again, a previous image portion will remain, in this case the top and bottom image portions of the 4:3 aspect ratio.

To solve the problems of residuary image portions displayed outside the borders of the input image, the second switch 194 receives the output signal generated by the OR gate 108 indicating a change to activate the background processor 109. Concurrently, the address writer 120 receives the output signal of the OR gate 108 to generate the writing address for one frame such that the frame for the selected window incorporates the background portion generated by the background processor 109. The second switch 194 receives the output of OR gate 108 and, for one frame period, the previous image data address stored in the image memory 160 is erased according to the background data generated by the background processor 109 before the image modifier outputs the image data.

Once the image modifier 110 outputs the image data, the address writer 120 generates the addresses for the selected window of the window selector 104. Using the data outputs of the image modifier 110 and the addresses generated by the address writer 120, the image is written in the image memory 160.

The multiple screen display is divided into many sections, and a few will be active while the rest remain stationary. Once the image memory 160 stores the image data for one field, the address reader 140 is initiated to read the entire field, and the read field is output to the display processor 180 for final processing. The display processor 180 will have an aspect ratio of 16:9 or 4:3 depending on the image format.

According to the preferred embodiment of the multiple screen HDTV processor, the image size is modified depending on the format, and using the change detector to activate the background generator to delete the unnecessary residuary image portions. various types, as well as aspect ratios, can be generated. In addition to the above explained features, an alternative embodiment of the present invention also eliminates the problem of overlapping images or frame tears due to changes in the image frame rates.

Figure 6:
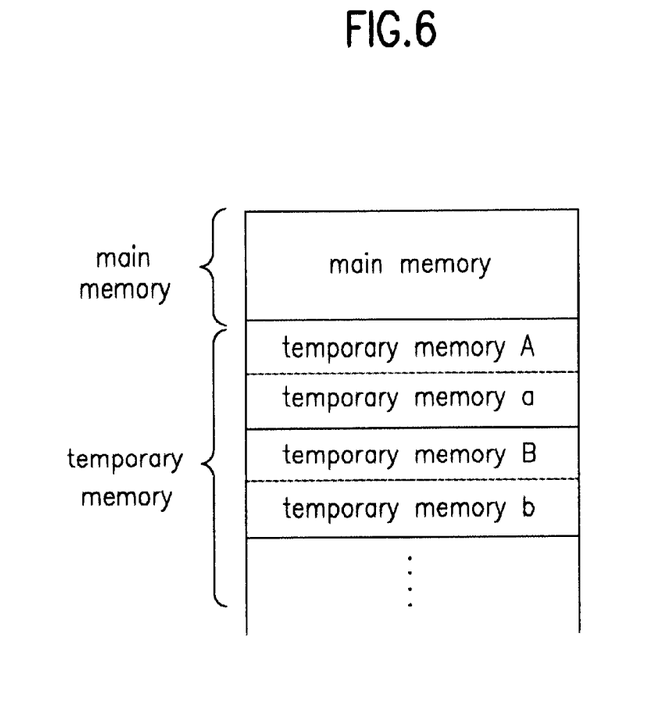
FIG. 6 shows one embodiment of the memory structure.
Figure 7:
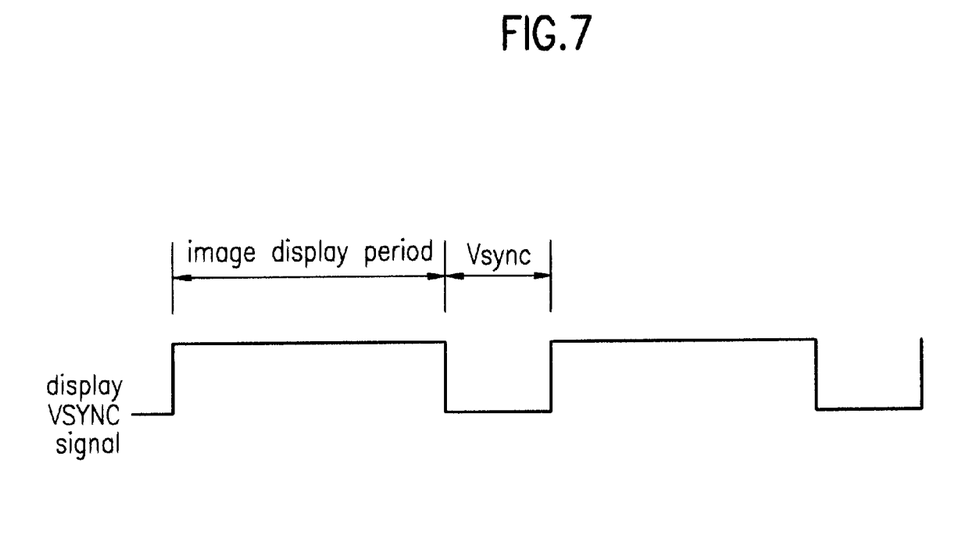
FIG. 7 shows a Vsync period of display.

The image memory 160 is divided into one main memory and a number of temporary memories, as shown in FIG. 6. The temporary memories temporarily store the image output by the secondary image output and during the Vsync signal period of the display, the appropriate data will be transferred to the main memory. The number of temporary memories correspond to the number of active windows on the multiple screen TV. The alternative embodiment provides a smooth display of images with various frame rates by writing in the main memory during the Vsync period of the display (shown in FIG. 7) which does not contain image data and thereafter timely reading the field at a same frame rate as the display.

Figure 8:
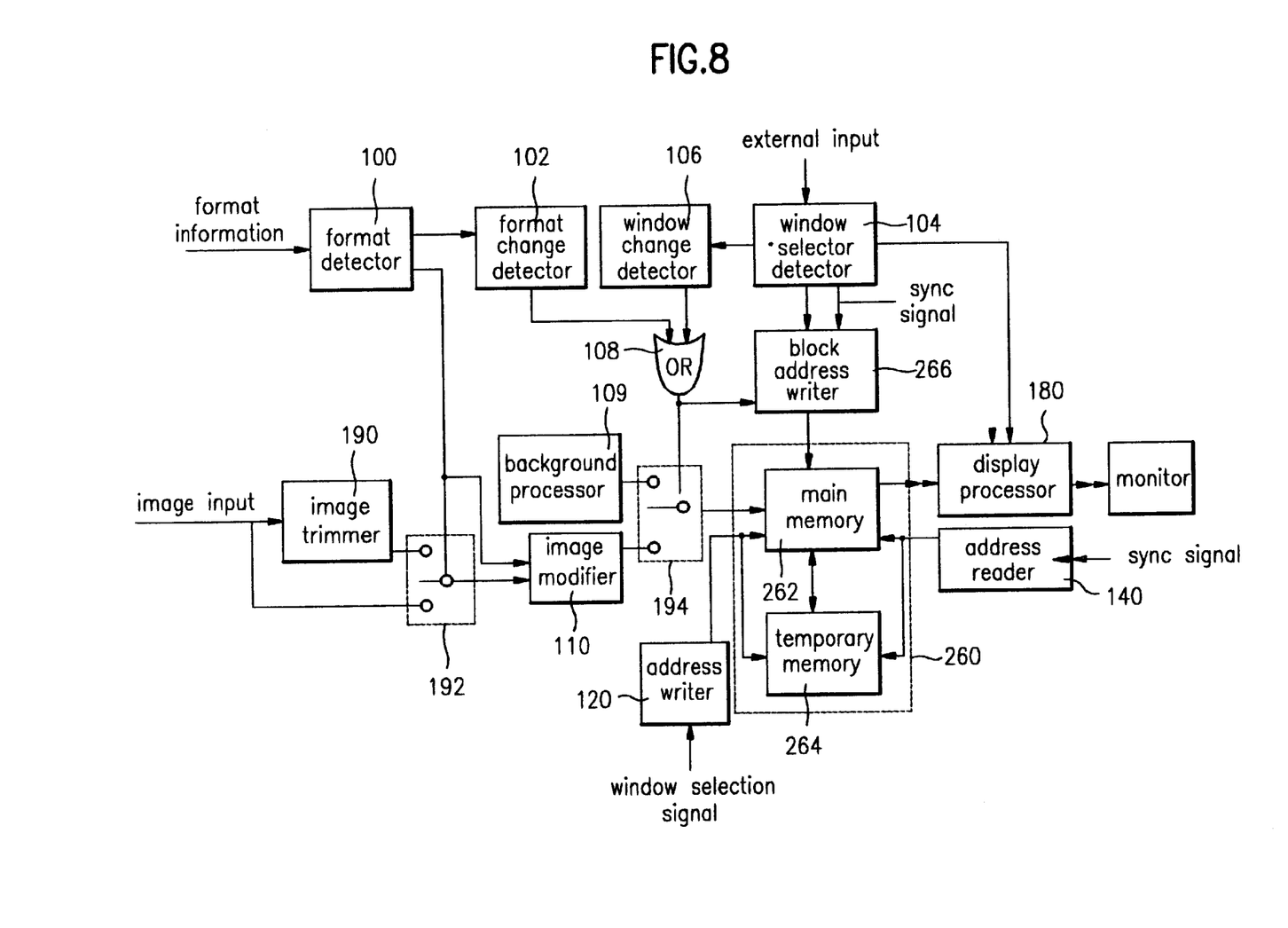
FIG. 8 is an alternate embodiment of the present invention.

FIG. 8 shows the alternative embodiment according to the present invention. The alternative embodiment includes the same elements as FIG. 4 described above and additionally includes a block address processor 266 and an image memory 260 comprising a main memory 262 and a temporary memory 264. The temporary memory 264 temporarily stores the image received from the second switch 194 in the address generated by the address writer 120. The stored data is later transferred to the main memory 262. The block address processor 266 generates the block address in the main memory 262 to read and write the data stored in the temporary memory 264 into main memory 262 during the Vsync signal period. Afterwards, the address reader 140 generates the address to read the image data stored in the main memory 262 at a corresponding rate to the display sync signal. The specific operations of the alternative embodiment will follow below.

As discussed above in reference to FIG. 4, the OR gate 108 combines the output signals of the format change detector 102 or the window change detector 106 to activate the background processor 109 through the second switch 194. Thus, either the format change detector 102 or the window change detector 106 activates the background processor 109 to generate the necessary background data portion. In the present embodiment, the block address processor 266 subsequently generates block address for the selected multiple screen window to incorporate the background data portion generated by the background processor 109. The second switch 194 receives the output of the OR gate 108 and for one frame period, the previous address for image data stored in the main memory 262 is erased according to the background data portion generated by the background processor 109, before the image modifier 110 outputs the image data.

Once the image modifier 110 is activated, the address writer 120 generates the address for the modified image in the temporary memory 264 and the modified image is written into the temporary memory 264. Afterwards, the block address processor 266 reads the data written in the temporary memory 264 during the frame sync signal period and generates the block address in the main memory 262 for the selected window of the multiple screen TV.

Figure 9:
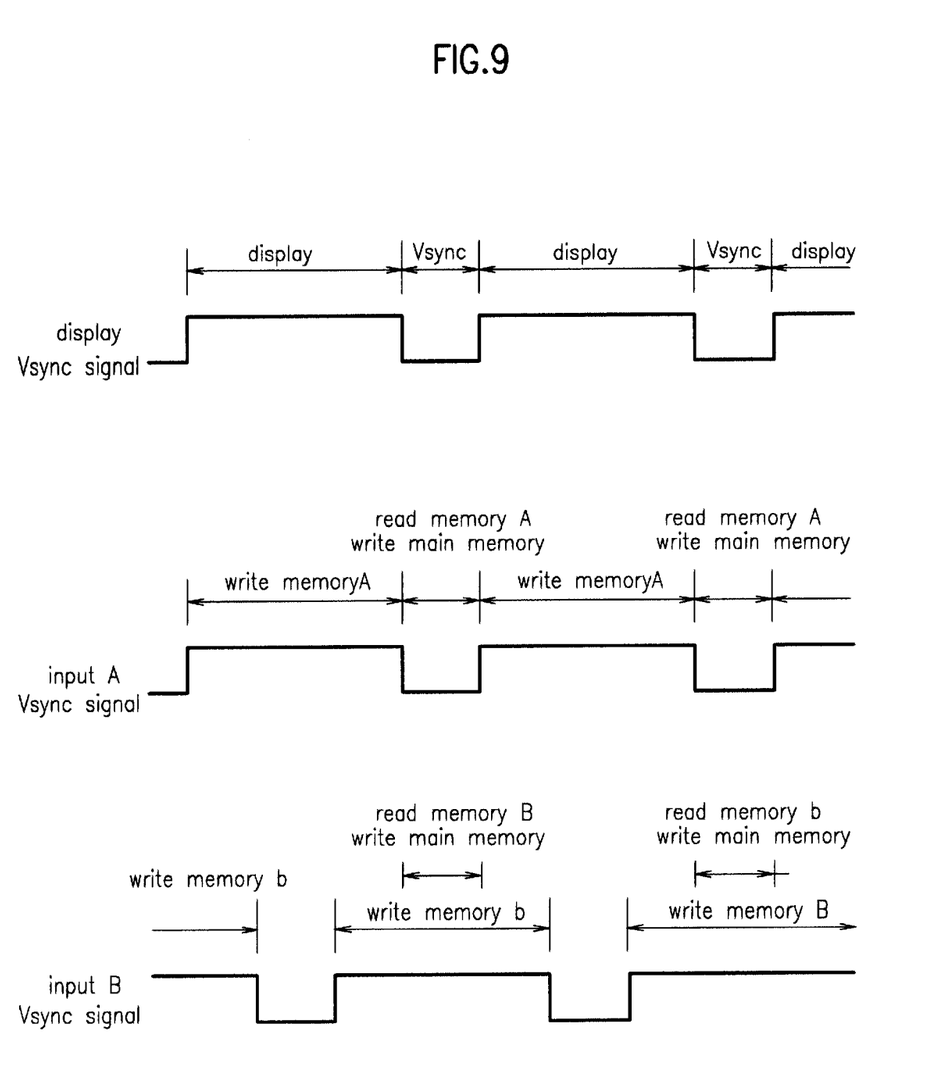
FIG. 9 shows examples of input signals with coincident and non-coincident frame sync signal to the display sync signal.

As discussed above, the image memory 260 is organized as shown in FIG. 6, the number of temporary memories corresponds to the number of active multiple screen windows. However, in some cases, the temporary memory requires a two level memory, Aa and Bb etc., to generate one active window of a multiple screen TV. For example, if an active window image data A and B are input as shown in FIG. 9, the sync signal for A input coincides with the display sync signal, but the sync signal for B input does not coincide with the display sync signal.

Because A's sync signal coincides with the display sync signal, a single memory level may be used to write during the display period, and to read and write to the main memory 262 during the non-display period. However, input B's sync signal does not coincide with the display frame sync signal, and may continue to write the reduced image during the non-display period. Accordingly, a two level memory is required for the B input. During the frame sync signal, the modified image is written into temporary memory b, while the image data already stored in temporary memory B can be transferred to main memory for a smooth display of images. Therefore, the frame rates may be compensated by one level temporary memory, but if the frame sync signal does not coincide with the display sync signal, a two level temporary memory is required.

Because the multiple screen has many screen windows, the block address processor 266 generates the writing address such that the image data will be written only to the windows selected by the window selector, thereby reading the image stored in the secondary memory and writing in the main memory. Consequently, a selected number of multiple screen windows are active, while the others are stationary. Particularly, the window display is active if an image is continuously written into the window. Afterwards, the address reader generates the reading address to timely read the image data stored in the main memory at the same frame rate as that of the necessary display. The display processor prepares the image output by the main memory through the reading address generated by address reader for final display.

Figure 10:
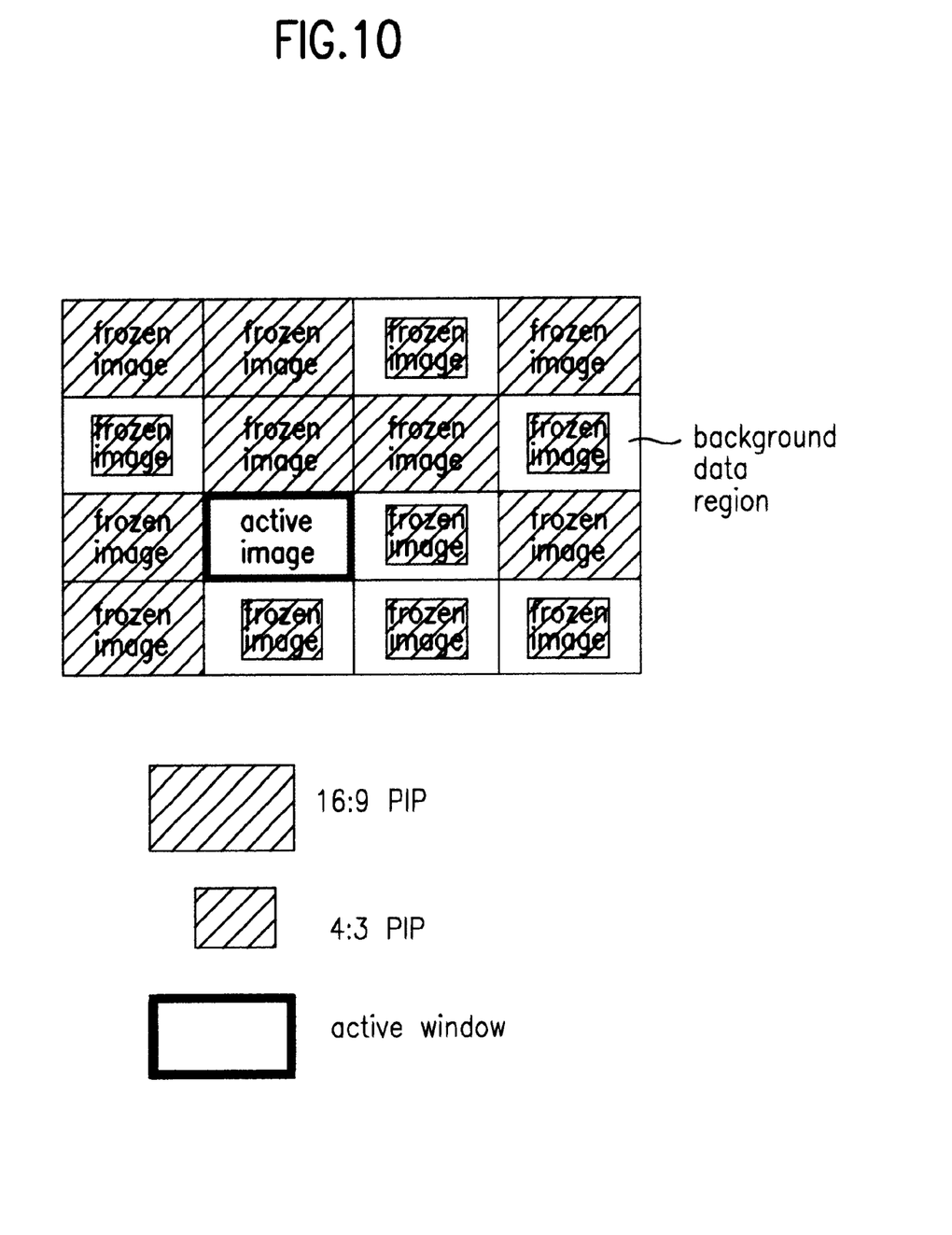
FIG. 10 shows a multiple screen TV.

As shown in FIG. 10, the display processor has an aspect ratio of 16:9 or 4:3 depending on the image format, and only a selected few windows will be seen as active. Moreover, different colors or thickness may be used to indicate the active windows and the display processor may additionally display channel information for each window thereby allowing the viewers to easily recognize an active window as well as the image being displayed.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A multiple screen TV processor comprising:

at least one of a format change detector and a window change detector, said format change detector being operable to detect a change in an input image of a screen window in terms of at least one of image format, image aspect ratio and image frame rate, said window change detector being operable to detect a change in said input image in terms of which screen of a multiple screen window is selected;

a modifier receiving the input image for a screen window and modifying the image, said modifier outputting the modified image;

a first processor generating a background image, for the screen window to overlay residuary image portions arising due to a change in the input image, before said modifier outputs the modified image; and a first switch, responsive to the detection of a change by said format change detector and said window change detector, for selectively outputting either the modified image after said first processor generates the background image or the modified image without the background image;

a second processor receiving the selected output of said first switch and preparing the selected image to be displayed on the screen window.

2. A processor of claim 1, wherein said signal generator comprises:

a format detector receiving the format information and detecting the image format;

wherein said format change detector is coupled to said format detector and is operable to output a first output signal indicating a change has been detected;

a window selection detector receiving the selection of a multiple screen window and detecting the selected multiple screen window;

wherein said window change detector is coupled to said window selection detector and is operable to output a second output signal indicating a change has been detected; and an OR gate coupled to said format change detector and said window change detector to receive the first and second output signals, said OR gate outputting a control signal to which said first processor and said first switch are responsive.

3. A processor of claim 2, further comprises:

an image trimmer receiving the input image for a screen window and trimming the borders of the input image; and a second switch coupled to said format detector and selectively outputting to said modifier either the trimmed image or the input image depending on the detected image format.

4. A processor of claim 2, wherein said second processor comprises:

an image memory receiving the image data output by said first switch;

an address writer coupled to said window selection detector and generating the appropriate writing address for the selected window within said image memory; and an address reader generating a reading address in said image memory wherein said second processor is coupled to said image memory and said window selector, said second processor receiving the selected image from said image memory;

wherein said image memory writes the received image data to the writing address generated by said address writer before reading the image data using the reading address generated by said address reader.

5. A processor of claim 4, wherein said image memory comprises:

a main memory; and a temporary memory receiving and storing the modified image output by said second switch, said temporary memory later transferring the modified image to said main memory.

6. A processor of claim 5, further comprising:

a Vsync detector detecting the field sync signal;

a block address processor coupled to said Vsync detector, said block address processor generating the block address within said main memory to read and write the modified image stored in the temporary memory into said main memory during the Vsync signal period.

7. A processor of claim 6, wherein said temporary memory has at least two levels of memory.

8. A processor of claim 1, wherein said modifier comprises:

at least one filter receiving the input image and outputting a filtered image; and a sub-sampler receiving the input image and the filtered image, said sub-sampler sub-sampling either the input image or the filtered Image and outputting a modified image.

9. A processor of claim 8, wherein said image modifier modifies the image by fitting the image to the size of the display screen window.

10. A processor of claim 8, wherein said modifier comprises:

a vertical filter receiving the input image and vertically filtering the image to output a vertically filtered image;

a horizontal filter receiving the input image and the vertically filtered image, said horizontal filter horizontally filtering either the input image or the vertically filtered image and outputting a horizontally filtered image;

a sub-sampler receiving the input image and the horizontally filtered image, said sub-sampler sub-sampling either the input image or the horizontally filtered image and outputting a modified image.

11. A processor of claim 8, wherein said memory controller comprises:

a main memory;

a temporary memory receiving the prepared image from said first image processor and temporarily storing the image, said temporary memory transferring the image to said main memory during the frame sync period of the display; and wherein said main memory outputs the image at a corresponding rate to the display sync signal.

12. A processor of claim 11, wherein the number of temporary memories correspond to the number of active windows on the multiple screen TV.

13. A processor of claim 11, wherein said temporary memory comprises a two level memory.

14. A method of controlling display for a multiple-screen display configuration, the method comprising:

detecting at least one of a change in an input image of a screen window by recognizing a change in at least one of image format, image aspect ratio and image rate or a change in which screen of a multiple screen window is selected;

generating a background image to overlay residuary image portions arising due to a change in the input image;

modifying one of an input image and a trimmed input image and outputting a modified image for said multiple-screen display;

selectively outputting, in response to the detection of a change in the input window, at least one of the modified image after the background image is generated and the modified image without the background;

preparing the selected one of said modified image and said background image for display in said multiple screen display configuration.

15. The method of claim 14, further comprising:

trimming a border of said input image to generate said trimmed input image.

16. The method of claim 14, wherein said image modifying step comprises:

sub-sampling one of said input image and said trimmed input image to output said modified image.

17. The method of claim 14, wherein said image modifying step comprises the sub-steps of:

horizontally filtering one of said input image and said trimmed input image; and sub-sampling one of said input image, said trimmed input image, and said horizontally filtered image to output said modified image.

18. The method of claim 14, wherein said image modifying step comprises:

vertically filtering one of said input image and said trimmed input image;

horizontally filtering one of said input image, said trimmed input image, and said vertically filtered image; and sub-sampling one of said input image, said trimmed input image, said horizontally filtered image, and said vertically filtered image to output said modified image.

19. The method of claim 14, further comprising:

detecting a format of said input image including an aspect ratio of said input image; and selecting one of said input image and said trimmed input image to be modified based on said detected format.

20. The method of claim 14, further comprising:

generating writing addresses based on said screen selection, wherein said display image is stored in an image memory addressed by said writing addresses.

21. The method of claim 20, wherein said generating writing address include generating addresses for temporary memories, wherein a number of temporary memories correspond to a number of screens of said multiple-screen display.

22. The method of claim 21, wherein said background image and said modified image are selected based on whether one or both format and screen selection has changed.

23. The method of claim 20, further comprising:

reading said display image from said image memory and displaying to said selected screen.

* * * * *